United States Patent
Bienas et al.

(10) Patent No.: US 9,008,647 B2
(45) Date of Patent: Apr. 14, 2015

(54) MOBILE RADIO COMMUNICATION NETWORK DEVICE, MOBILE TERMINAL, AND METHOD FOR TRANSMISSION/RECEPTION OF CONTROL INFORMATION

(75) Inventors: Maik Bienas, Braunschweig (DE); Markus Dominik Mueck, Unterhaching (DE); Andreas Schmidt, Braunschweig (DE); Achim Luft, Braunschweig (DE)

(73) Assignee: Intel Mobile Communications GmbH, Neubiberg (DE)

( * ) Notice: Subject to any disclaimer, the term of this patent is extended or adjusted under 35 U.S.C. 154(b) by 1046 days.

(21) Appl. No.: 12/772,271

(22) Filed: May 3, 2010

(65) Prior Publication Data

US 2011/0269447 A1 Nov. 3, 2011

(51) Int. Cl.
| | | |
|---|---|---|
| H04Q 7/20 | (2006.01) | |
| H04W 8/22 | (2009.01) | |
| H04W 8/04 | (2009.01) | |
| H04W 24/10 | (2009.01) | |

(52) U.S. Cl.
CPC . *H04W 8/22* (2013.01); *H04W 8/04* (2013.01); *H04W 24/10* (2013.01)

(58) Field of Classification Search
USPC .............. 370/320; 455/422.1, 456.1, 552.1; 709/227
See application file for complete search history.

(56) References Cited

U.S. PATENT DOCUMENTS

| | | | |
|---|---|---|---|
| 7,636,563 B2 | 12/2009 | Kim et al. | |
| 2005/0119008 A1* | 6/2005 | Haumont | 455/456.1 |
| 2005/0181799 A1* | 8/2005 | Laroia et al. | 455/450 |
| 2007/0064641 A1* | 3/2007 | Laroia et al. | 370/320 |
| 2007/0297385 A1* | 12/2007 | Ishizu et al. | 370/342 |
| 2008/0043656 A1 | 2/2008 | Yoon et al. | |
| 2009/0176513 A1 | 7/2009 | Bosch et al. | |
| 2010/0057485 A1* | 3/2010 | Luft | 705/1 |

(Continued)

FOREIGN PATENT DOCUMENTS

| | | |
|---|---|---|
| CN | 1810048 A | 7/2006 |
| CN | 101080935 A | 11/2007 |
| DE | 10222583 A1 | 12/2003 |

(Continued)

OTHER PUBLICATIONS

3GPP TS 22.368 V1.1.1 (Nov. 2009) 3rd Generation Partnership Project; Technical Specification Group Services and System Aspects; Service requirements for machine-type communications; Stage 1 (Release 10); pp. 1-23.

(Continued)

*Primary Examiner* — Myron K Wyche
(74) *Attorney, Agent, or Firm* — Schwabe, Williamson & Wyatt, P.C.

(57) ABSTRACT

A mobile radio communication network device is described including a receiver configured to receive control information from a mobile terminal, wherein the receiver is configured to receive the control information in a first mode or in a second mode, wherein in the second mode, less of the control information is received in time from the mobile terminal than in the first mode, and a controller configured to control the receiver to receive the control information in the first mode if the mobile terminal is associated with a first mobile terminal mobility class and to control the receiver to receive the information in the second mode if the mobile terminal is associated with a second mobile terminal mobility class.

20 Claims, 9 Drawing Sheets

(56) References Cited

U.S. PATENT DOCUMENTS

2012/0281658 A1* 11/2012 Rikkinen et al. ............ 370/329
2013/0013793 A1* 1/2013 Sanchez ..................... 709/227

FOREIGN PATENT DOCUMENTS

EP          1058408 A1    12/2000
WO       2004095851 A2    11/2004

OTHER PUBLICATIONS

3GPP TS 23.401 V8.6.0 (Jun. 2009) 3rd Generation Partnership Project; Technical Specification Group Services and System Aspects; General Packet Radio Service (GPRS) enhancements for Evolved Universal Terrestrial Radio Access Network (E-UTRAN) access (Release 8); pp. 1-227.

3GPP TS 36.304 V8.7.0 (Sep. 2009) 3rd Generation Partnership Project; Technical Specification Group Radio Access Network; Evolved Universal Terrestrial Radio Access (E-UTRA); User Equipment (UE) procedures in idle mode (Release 8); pp. 1-30.

3GPP TSG-RAN #45, Sep. 15-18, 2009, Sevilla, Spain RP-090991 RAN Improvements for Machine-type Communications, Huawei et al.; pp. 1-5.

English language abstract of DE 10222583 A1 dated Dec. 24, 2003.

3GPP TR 23.888V0.3.2 (Mar. 2010) 3rd Generation Partnership Project; Technical Specification Group Services and System Aspects; System Improvements for Machine-Type Communications; (Release 10); pp. 1-33.

3GPP TS 22.368 V10.0.0 (Mar. 2010) 3rd Generation Partnership Project; Technical Specification Group Services and System Aspects; Service requirements for Machine-Type Communications (MTC); Stage 1 (Release 10), pp. 1-25.

Office action in corresponding German application No. 10-2011-050034.0, dated Jan. 14, 2013.

Office action in corresponding Chinese application No. 201110112659.2, dated Aug. 28, 2013.

Second Office action in corresponding Chinese application No. 201110112659.2, dated Jul. 14, 2014, 31 pages, including 17 pages of English translation.

* cited by examiner

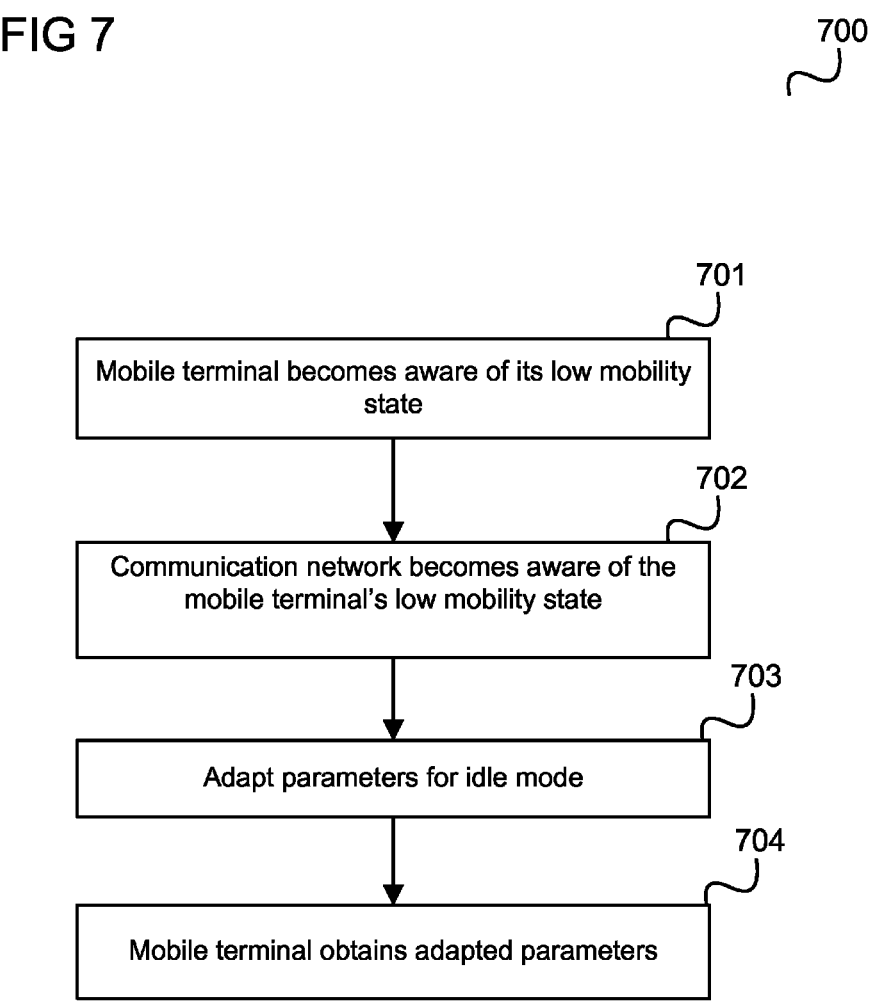

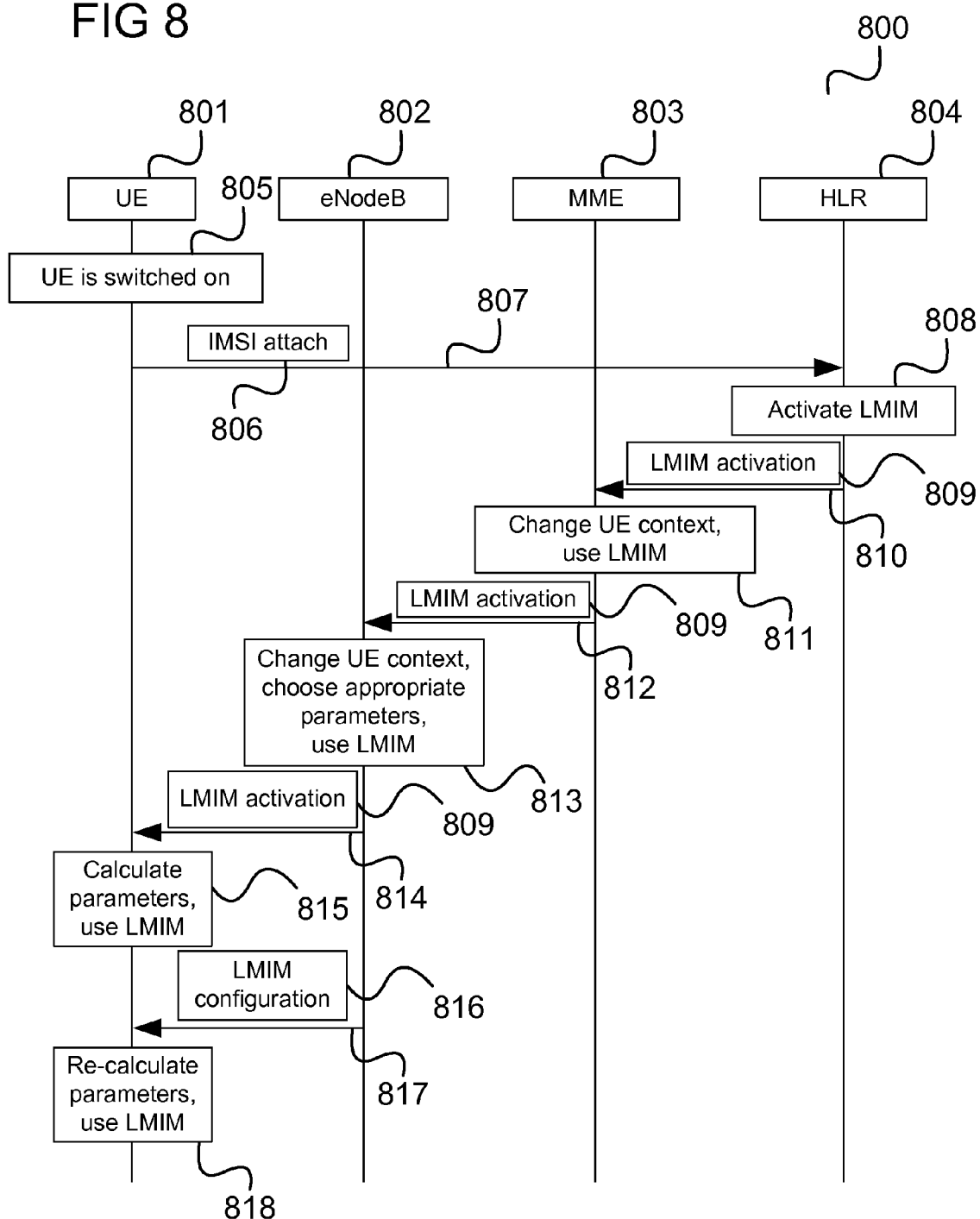

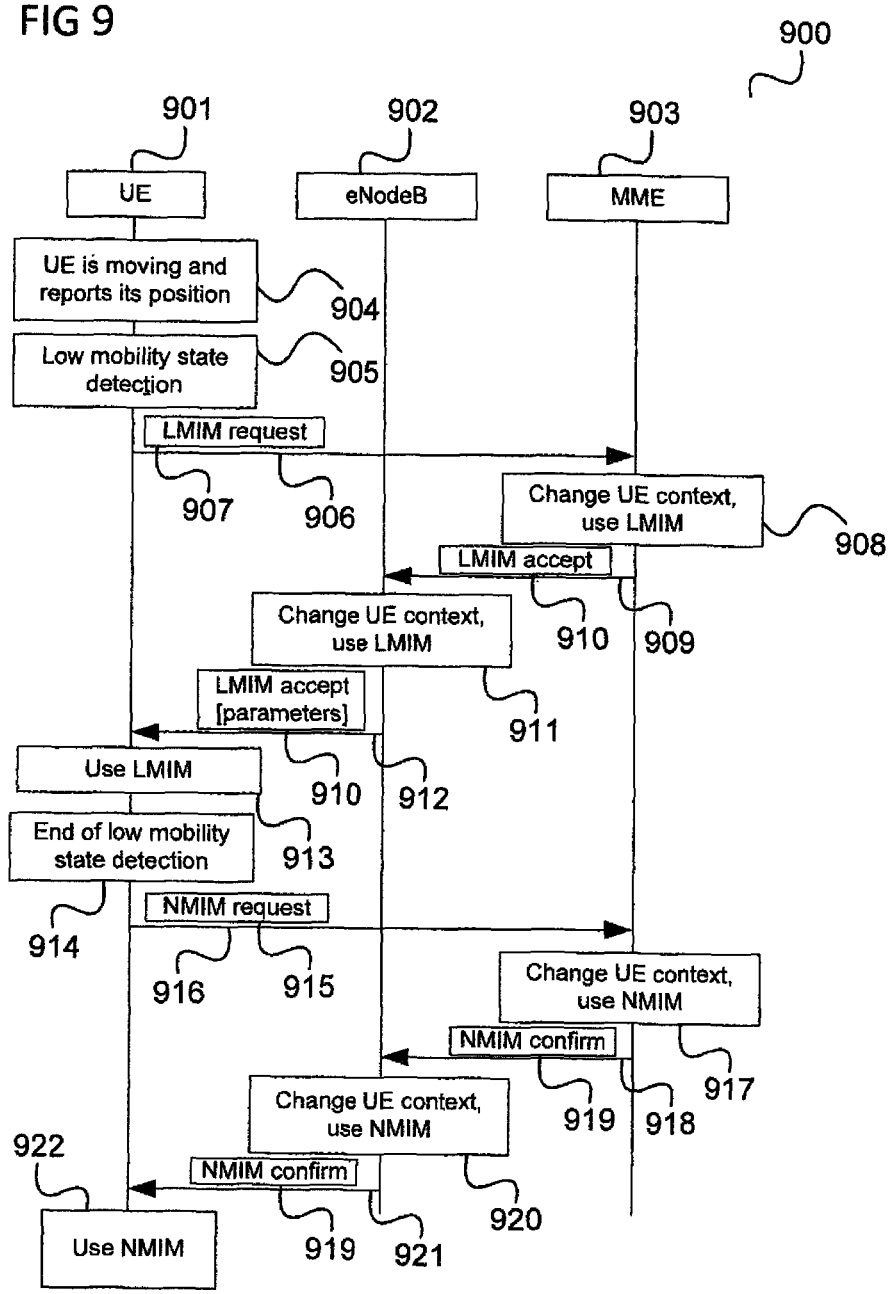

MOBILE RADIO COMMUNICATION NETWORK DEVICE, MOBILE TERMINAL, AND METHOD FOR TRANSMISSION/RECEPTION OF CONTROL INFORMATION

TECHNICAL FIELD

Embodiments relate generally to a mobile radio communication network device, mobile terminals, and methods for transmission/reception of control information.

BACKGROUND

3GPP (3rd Generation Partnership Project) has introduced LTE (Long Term Evolution) into the Release 8 version of UMTS (Universal Mobile Telecommunication System) standards. With LTE, the UMTS air interface is further optimized for packet data transmission by improving the system capacity and the spectral efficiency.

A current topic in the 3GPP standardization fora is the study on further advancements of LTE (Long Term Evolution), also referred to as LTE-Advanced. One of the key characteristics of LTE-Advanced is the support of bandwidths >20 MHz and up to 100 MHz by spectrum aggregation, i.e. the bandwidth of an LTE-Advanced (LTE-A) radio cell is divided into a number of so-called component carriers (CC), wherein the bandwidth size of each component carrier is limited to a maximum of 20 MHz. Further, in view of the market potential, 3GPP decided to support MTC (machine type communication) in future releases of the UMTS system, and agreed on the service requirements.

Efficient methods for supporting machine type communication and for using communication resources in general in mobile communication systems are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 7 shows a flow diagram according to an embodiment.

FIG. 8 shows a message flow diagram.

FIG. 9 shows a message flow diagram.

DESCRIPTION

3GPP (3rd Generation Partnership Project) has introduced LTE (Long Term Evolution) into the Release 8 version of UMTS (Universal Mobile Telecommunication System) standards. With LTE the UMTS air interface is further optimized for packet data transmission by improving the system capacity and the spectral efficiency. Amongst others, the maximum net transmission rate is increased significantly, namely to 300 Mbps in the downlink transmission direction and to 75 Mbps in the uplink transmission direction. Further, LTE supports scalable bandwidths of 1.4, 3, 5, 10, 15, and 20 MHz and is based on the multiple access methods OFDMA/TDMA (orthogonal frequency division multiple access/time division multiple access) in downlink and SC-FDMA/TDMA (single carrier-frequency division multiple access/TDMA) in uplink. OFDMA/TDMA is a multicarrier multiple access method in which a subscriber is provided with a defined number of subcarriers in the frequency spectrum and a defined transmission time for the purpose of data transmission. The RF bandwidth capability of an LTE UE (user equipment) for transmission and reception has been set to 20 MHz. A physical resource block (PRB) is the baseline unit of allocation for the physical channels defined in LTE. A physical resource block may include a matrix of 12 subcarriers by 6 or 7 OFDMA/SC-FDMA symbols. A pair of one OFDMA/SC-FDMA symbol and one subcarrier may be denoted as resource element (RE).

Figure 1:
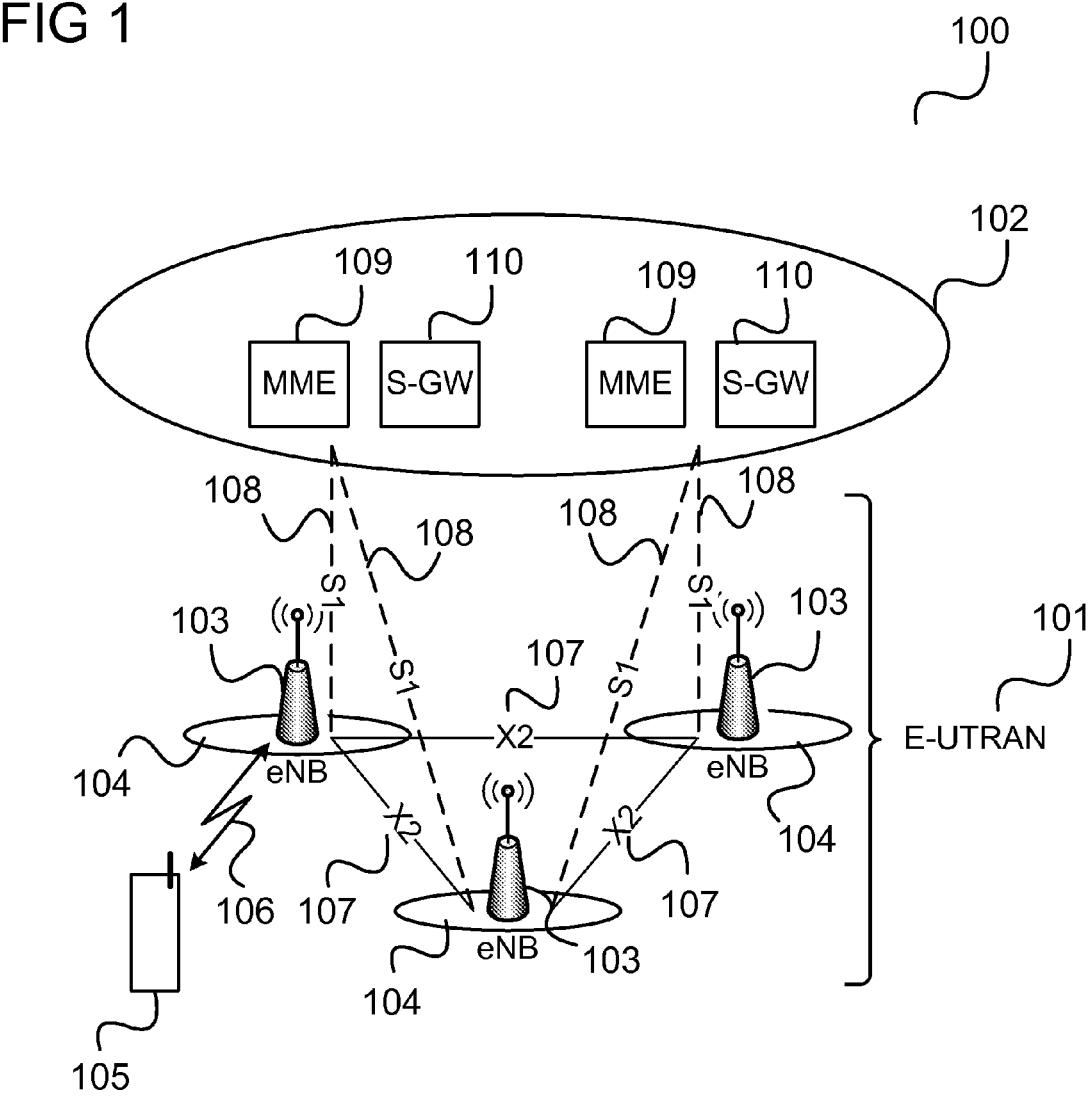
FIG. 1 shows a communication system according to an embodiment.

FIG. 1 shows a communication system 100 according to an embodiment.

According to this embodiment, the communication system 100 is configured in accordance with the network architecture of LTE. It is to be noted that in alternative embodiments, the communication system 100 may be configured in accordance with the network architecture of any other suitable telecommunication technology or standard, e.g. providing a plurality of base stations each operating one of a plurality of radio cells, (direct or indirect) connections between the base stations for exchanging information and components for controlling radio resource usage etc. as well as possibly connections to other communication networks such as the Internet.

The communication system includes a radio access network (E-UTRAN, Evolved UMTS Terrestrial Radio Access Network) 101 and a core network (EPC, Evolved Packet Core) 102. The E-UTRAN 101 may include base (transceiver) stations (eNodeBs, eNBs) 103. Each base station 103 provides radio coverage for one or more mobile radio cells 104 of the E-UTRAN 101.

A mobile terminal (UE, user equipment) 105 located in a mobile radio cell 104 may communicate with the core network 102 and with other mobile terminals via the base station providing coverage (in other words operating) in the mobile radio cell.

Control and user data may be transmitted between a base station 103 and the mobile terminal 105 located in the mobile radio cell 104 operated by the base station 103 over the air interface 106 on the basis of a multiple access method.

The base stations 103 may be interconnected with each other via a broadband interconnection, e.g. a wireline interconnection, e.g. by means of the so-called X2 interface 107. The base stations 103 are also connected by means of the Si interface 108 to the core network (Evolved Packet Core) 102, more specifically to a MME (Mobility Management Entity) 109 and a Serving Gateway (S-GW) 110. The MME 109 is responsible for controlling the mobility of UEs located in the coverage area of E-UTRAN, while the S-GW 110 is responsible for handling the transmission of user data between mobile terminals 105 and core network 102.

The communication system 100 may for example be used for machine type communication (MTC). MTC is a topic that gained strong interest in the recent years as market growth is expected in the future. Machine type communication, as for example defined in 3GPP TS 22.368, can be understood to be a form of data communication which involves one or more entities that do not necessarily need human interaction. Examples of MTC applications include fleet management, remote maintenance and control, and remote diagnostics.

Figure 2:
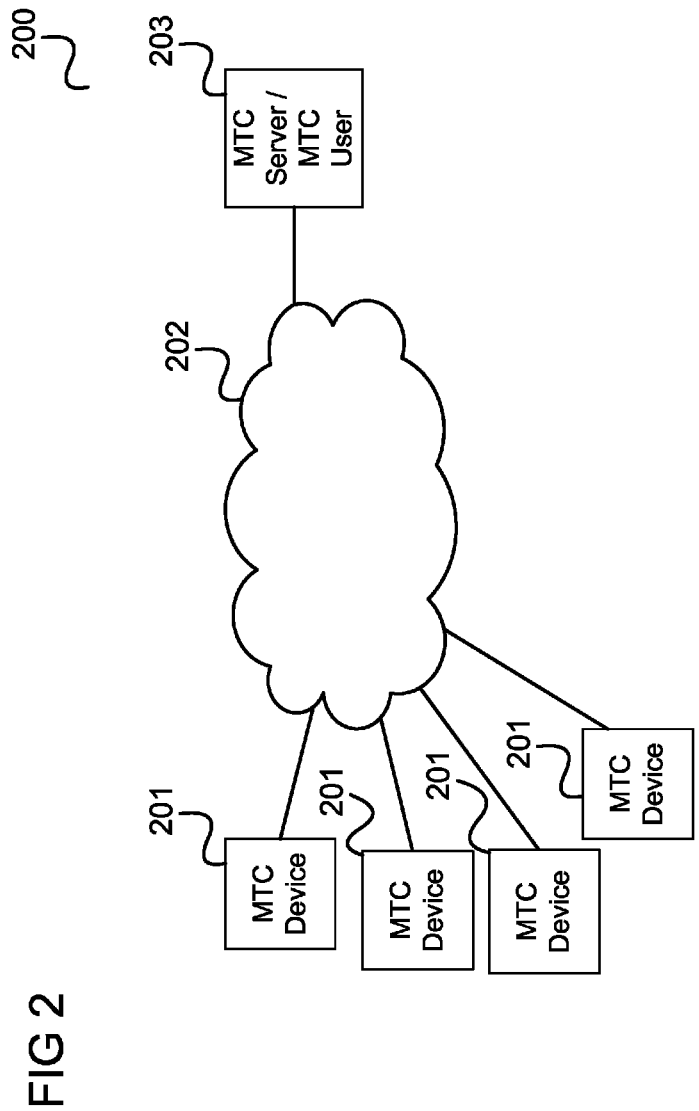
FIG. 2 shows a high-level network architecture to support MTC (machine type communication) according to one embodiment.

FIG. 2 shows a high-level network architecture 200 to support MTC according to one embodiment.

According to the high-level network architecture 200 MTC devices 201 are provided which may be seen to correspond to mobile terminals 105 of the communication system 100 shown in FIG. 1. An MTC Device is a user equipment equipped for Machine-type communication, which communicates through a communication network, e.g. a PLMN (Public Land Mobile Network) 202, with an MTC Server. The communication network 202 may be seen to correspond to the network side of the communication system 100, i.e. the radio access network 101 and the core network 102 to which the MTC Server 203 may for example be connected and may also been seen as being part of the domain of the mobile network operator.

The MTC Server is an entity which communicates to the communication network 202 itself and to MTC Devices 201 through the communication network 202. The MTC Server 203 performs services for an MTC User. The MTC server 203 may be located inside or outside the communication network 202 (e.g. may also be part of the core network 102) depending on the level of flexibility to be introduced.

An MTC User may use the service provided by the MTC Server 203. On the 3GPP working group level, a study item on RAN Improvements for MTC has been recently approved. The objective is to study how to enable efficient use of RAN resources (UTRA/E-UTRA) for machine-type communications considering their specific requirements. One of the requirements for MTC to be considered is low mobility. Optimizations should be found for devices which never move at all, move infrequently, or move only within a certain region.

The idle mode procedures currently defined in the 3GPP standard are optimized for mobile devices. (Please note that "idle mode" is also called "RRC idle state"). To use such procedures for low mobility devices without adaption may lead to a high amount of mobile terminal activities that may be considered to be unnecessary in view of the low mobility, e.g. the mobile terminal performs measurements of neighboring cells and of the camped cell (i.e. of the radio cell in which the mobile terminal is located), reports the measurement results and the current location (periodic TAU, tracking area update, and RAU, routing area update) to the core network and monitors the paging channel and the system information signalling (e.g. system information broadcast). In case such activities are unnecessary due to a low mobility of the mobile terminal, this can be seen as a waste of power and as unnecessarily occupied resources.

According to the 3GPP standard, so called Idle state signaling reduction (ISR) is defined. This feature aims at reducing the frequency of TAU and RAU procedures caused by mobile terminals reselecting between E-UTRAN and GERAN (GSM EDGE Radio Access Network)/UTRAN. This is enabled by attaching the corresponding mobile terminal using several different radio access technologies (RATs) simultaneously. The mobile terminal transmits a RAU/TAU only in case that all tracking areas have changed. The network pages the mobile terminal on all registered RATs simultaneously.

Thus, ISR is designed to reduce signaling of mobile UEs. According to one embodiment, idle state activities of UEs with low mobility is reduced instead.

Further, a feature called "Mobility states of a UE" is defined according to the 3GPP standard. This feature reduces the number of cell reselections for fast moving mobile terminals. For this, the mobile terminals are classified according to three different mobility states based on the number of cell reselections during a configurable time period. Based on the selected mobility state, parameters used for cell re-selection are modified and the number of cell re-selection is thus reduced for fast moving UEs.

The mobility states concept is designed to reduce the number of cell re-selection for fast moving UEs. According to one embodiment, idle mode activities of mobile terminals with lower mobility are reduced instead.

In the following, a communication network device and mobile terminals according to embodiments are described.

Figure 3:
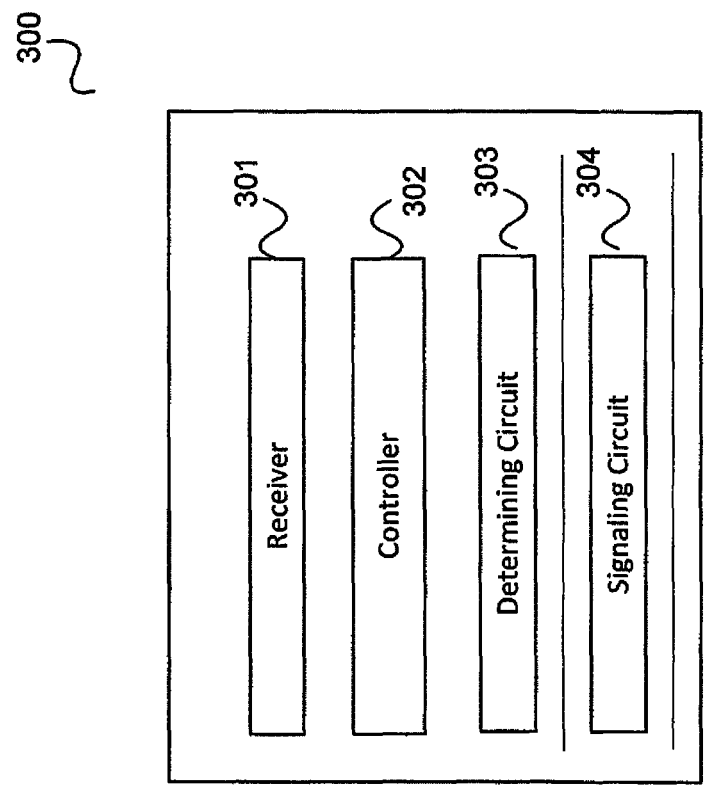
FIG. 3 shows a communication network device according to an embodiment.

FIG. 3 shows a mobile radio communication network device 300 according to an embodiment.

The mobile radio communication network device 300 includes a receiver 301 configured to receive control information from a mobile terminal, wherein the receiver is configured to receive the control information in a first mode or in a second mode, wherein in the second mode, less of the control information is received in time from the mobile terminal than in the first mode.

The mobile radio communication network device 300 further includes a controller 302 configured to control the receiver 301 to receive the control information in the first mode if the mobile terminal is associated with a first mobile terminal mobility class and to control the receiver 301 to receive the information in the second mode if the mobile terminal is associated with a second mobile terminal mobility class, wherein the second mobile terminal mobility class is a class of terminals with lower mobility than the first mobile terminal mobility class.

In one embodiment, the control information includes at least one of reception quality measurement information and location information.

In one embodiment, the mobile radio communication network device 300 includes a determining circuit 303 configured to determine whether the mobile terminal is associated with the second mobile terminal mobility class.

The determining circuit is for example configured to determine whether the mobile terminal is associated with the second mobile terminal mobility class based on a indicator indicating whether the mobile terminal is associated with the second mobile terminal mobility class stored in the communication network. The indicator is for example stored in a home location register or a similar register (or server) for subscriber (user) information of the communication network.

The receiver may further be configured to (or the mobile radio communication network device may include another receiver configured to) receive a message specifying whether the mobile terminal is associated with the second mobile terminal mobility class stored in the communication network, wherein the determining circuit is configured to determine whether the mobile terminal is associated with the second mobile terminal mobility class based on the message.

The message is for example received by the receiver from the mobile terminal. The message may also be received by the receiver from another mobile radio communication network device, e.g. an MME.

According to one embodiment, the determining circuit is configured to determine whether a mobility value associated with the mobile terminal is lower than a threshold mobility value wherein the mobility value specifies a movement speed of the mobile terminal and wherein the determining circuit is configured to determine that the mobile terminal is associated with the second mobile terminal mobility class if the mobility value is lower than the threshold mobility value.

In one embodiment, in both the first mode and the second mode, the communication network device is configured such that there is no established communication connection between the communication network device and the mobile terminal. In one embodiment, in both the first mode and the second mode, the communication network device is configured such that there is no established dedicated communication connection between the (mobile radio) communication network device (which is e.g. a base station) and the mobile terminal.

For example, the first mode and the second modes are used in idle mode of the mobile terminal. For example, the first mode is a normal idle mode (e.g. an idle mode used as default for mobile terminal) (e.g. a radio resource control (RRC) idle mode) and the second mode is a low mobility idle mode (e.g. a radio resource control (RRC) low mobility idle mode) set when the mobile terminal is a low mobility mobile terminal, e.g. is in a low mobility state or is pre-defined as low mobility device. In one embodiment, the first mode and the second mode are used in a network layer (layer 3 according to the OSI model) state, e.g. an RRC (radio resource control) state, in which no communication connections are established between the mobile terminal and the mobile radio communication network device.

In one embodiment, the receiver is configured to receive control information less frequently from the mobile terminal in the second mode than in the first mode. In one embodiment, in the second mode, control information is received by the receiver with less detail from the mobile terminal than in the first mode. For example, measurement values are less exact or measurements of less measurement types are carried out by the mobile terminal and reported to the communication network.

In one embodiment, in the first mode, the control information is received by the receiver according to at least one first parameter and in the second mode, the control information is received according to at least one second parameter, wherein the at least one second parameter is selected with respect to the at least one first parameter such that in the second mode, less of the control information is received in time from the mobile terminal than in the first mode. For example, control information is sent/received according to a pre-defined periodicity (generally the frequency of occurrence) or accuracy in the first mode and with lower periodicity (generally the frequency of occurrence) or accuracy in the second mode.

The mobile radio communication network device may further include a signaling circuit 301 configured to signal the at least one second parameter to the mobile terminal.

In one embodiment, the mobile radio communication network device includes a signaling circuit configured to signal at least one adaptation parameter to the mobile terminal based on which the at least one second parameter can be determined from the at least one first parameter. For example, the adaptation parameter is an extension factor by which the first parameter is to be multiplied to get the second parameter.

Figure 4:
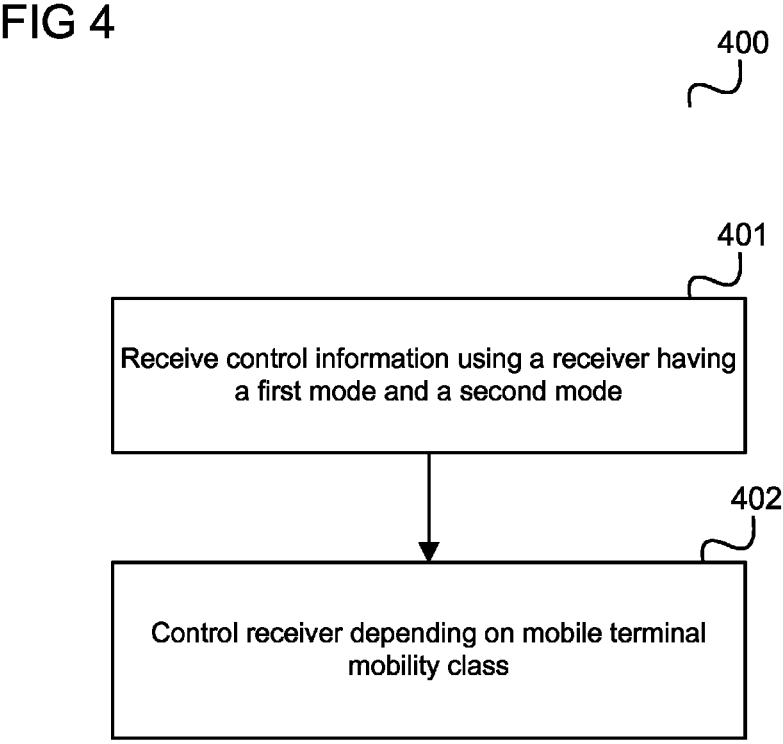
FIG. 4 shows a flow diagram according to an embodiment.

The mobile radio communication device for example carries out a method as illustrated in FIG. 4.

FIG. 4 shows a flow diagram 400 according to an embodiment.

The flow diagram 400 illustrates a method for receiving control information.

In 401, control information is received from a mobile terminal using a receiver configured to receive the control information in a first mode or in a second mode, wherein in the second mode, less of the control information is received in time from the mobile terminal than in the first mode.

In 402, the receiver is controlled to receive the control information in the first mode if the mobile terminal is associated with a first mobile terminal mobility class and the receiver is controlled to receive the information in the second mode if the mobile terminal is associated with a second mobile terminal mobility class, wherein the second mobile terminal mobility class is a class of terminals with lower mobility than the first mobile terminal mobility class.

The mobile terminal is for example a mobile terminal as described in the following with reference to FIG. 5.

Figure 5:
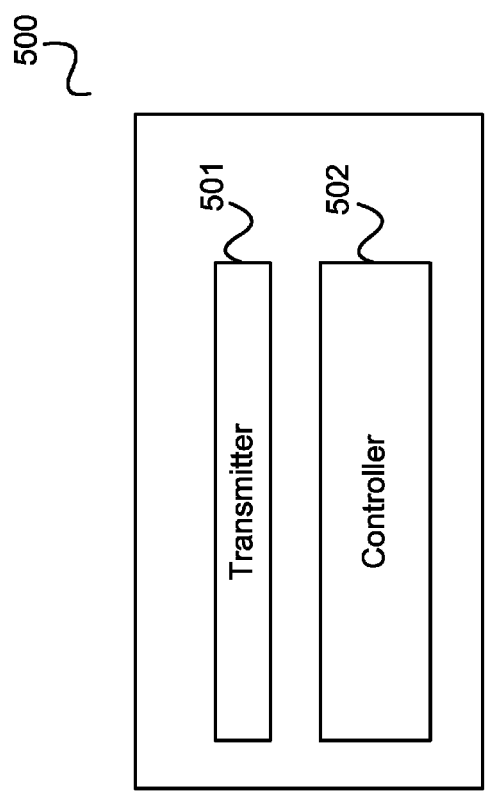
FIG. 5 shows a communication terminal device according to an embodiment.

FIG. 5 shows a mobile terminal 500 according to an embodiment.

The mobile terminal 500 includes a transmitter 501 configured to transmit control information, wherein the transmitter 501 is configured to transmit the control information in a first mode or in a second mode, wherein in the second mode, less of the control information is transmitted in time than in the first mode.

The mobile terminal 500 further includes a controller 502 configured to control the transmitter 501 to transmit the control information in the first mode if the mobile terminal 500 is associated with a first mobile terminal mobility class and to control the transmitter 501 to transmit the information in the second mode if the mobile terminal 500 is associated with a second mobile terminal mobility class, wherein the second mobile terminal mobility class is a class of terminals with lower mobility than the first mobile terminal mobility class.

In one embodiment, the mobile terminal is a radio communication device of a cellular mobile communication network.

Figure 6:
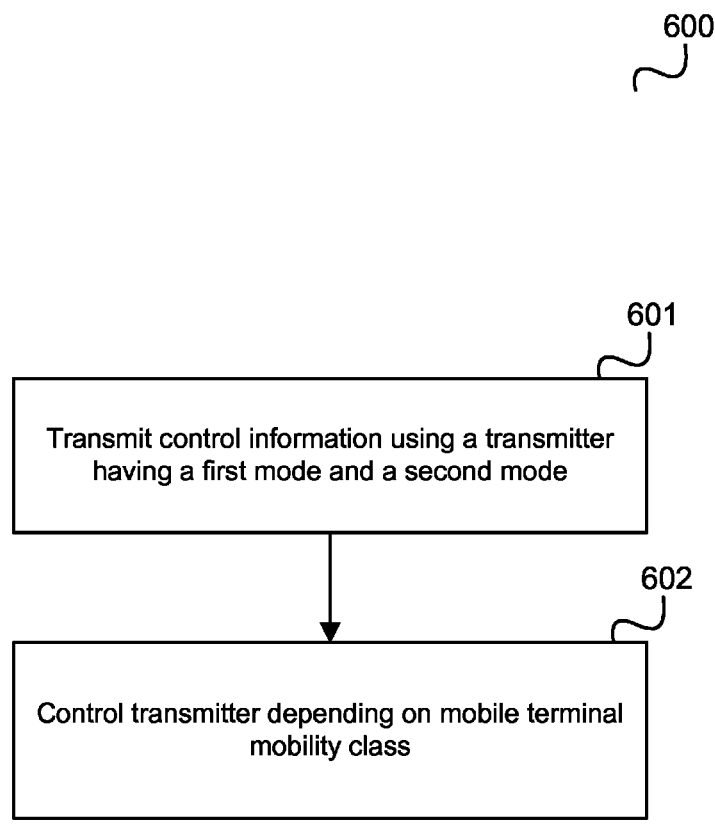
FIG. 6 shows a flow diagram according to an embodiment.

The mobile terminal 500 for example carries out a method as illustrated in FIG. 6.

FIG. 6 shows a flow diagram 600 according to an embodiment.

The flow diagram 600 illustrates a method for transmitting control information.

In 601, control information is transmitted using a transmitter configured to transmit the control information in a first mode or in a second mode, wherein in the second mode, less of the control information is transmitted in time than in the first mode.

In 602, the transmitter is controlled to transmit the control information in the first mode if the mobile terminal is associated with a first mobile terminal mobility class and the transmitter is controlled to transmit the information in the second mode if the mobile terminal is associated with a second mobile terminal mobility class, wherein the second mobile terminal mobility class is a class of terminals with lower mobility than the first mobile terminal mobility class.

It should be noted that embodiments described in context with the mobile radio communication network device are analogously valid for the methods for reception/transmission of control information and the mobile terminal and vice versa.

A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Illustratively, in one embodiment, the amount of control information sent by a mobile terminal (i.e. the terminal side of a mobile communication system) or, on the other hand, received by the communication network (i.e. the network side of a mobile communication system) is reduced when the mobile terminal is classified as being a mobile terminal of low mobility, e.g. an MTC device located in a stationary or seldomly moved machine (e.g. a vending machine). The reduction of the amount of control information sent/received may be achieved by for example sending/receiving control information less frequently or sending/receiving less control information in one sending/receiving event e.g. sending a control information of smaller size, for example a measurement report with less measurement values. The reduction of control signalling is for example applied for mobile terminals in idle mode according to 3GPP, or generally a state in which the mobile terminal has no connections, no dedicated connections and/or no logical connections to the mobile radio communication network and for example only sends and receives data to/from the mobile radio communication network via one or more shared or broadcast channels.

According to one embodiment, a communication network, e.g. the network side of the communication system 100, for example including the radio access network 101 and the core network 102, and a mobile terminal are configured to reduce idle mode activities for the mobile terminal in case the mobile terminal has low or (practically) no mobility.

According to one embodiment, this is achieved by the mobile terminal (e.g. a UE in case of a UMTS communication system) detecting its current mobility behavior, the mobile terminal requesting to use a idle mode type appropriate for the detected mobility behavior and the network (i.e. a component of the network side) selecting appropriate parameters for the mobile terminal, activating the appropriate idle mode and transmitting the parameters to the mobile terminal wherein the parameters are selected such that they lead to to reduced idle mode activities for the mobile terminal if the mobile terminal sets its operation (e.g. the frequency of measurements or signalling of location area information) in accordance with these parameters.

In the following, an example for this is described in greater detail with reference to FIG. 7.

FIG. 7 shows a flow diagram 700 according to an embodiment.

The flow diagram 700 illustrates a method for reducing idle mode activities for a mobile terminal 105 with low or no mobility.

In 701, the mobile terminal 105 is made aware of its low mobility property. The low mobility property may be pre-configured in the mobile terminal 105 or may be assigned to the mobile terminal 105 dynamically and automatically during operation of the mobile terminal 105, e.g. by detection of the mobility behavior by the mobile terminal 105 itself or by signalling of the network side (e.g. the radio access network 101) of the communication system 100.

In 702, the network side of the communication system 100 (e.g. an MME 109 and/or a base station 103) is made aware of the low mobility property of the mobile terminal 105. This may for example be determined based on signaling from the mobile terminal, by requesting the related information from a communication network entity (e.g. an HLR, home location register, of the core network 102) or automatically during operation by detection of the mobility behavior. Please note that the order of 701 and 702 may be reversed depending on whether the network side or the mobile terminal 105 first classifies the mobile terminal 105 as a low mobility device.

In 703, parameters used for idle mode procedures by both the network side of the communication system 100 and the mobile terminal 105 are adapted in case the low mobility property is set for the mobile terminal 105. These parameters may differ from the corresponding parameters used for normal idle mode, i.e. idle mode of a mobile terminal not classified as low mobility mobile terminal.

For example,
a. the frequency for monitoring the system information and the paging channel by the mobile terminal 105 is reduced with respect to normal idle mode;
b. the frequency for measurements (e.g. reception quality measurements) by the mobile terminal 105 is reduced with respect to normal idle mode;
c. the frequency for measurement reporting is reduced with respect to normal idle mode;
d. the frequency for transmission of periodic tracking area update messages is reduced with respect to normal idle mode or the transmission of periodic location update messages is stopped until the UE moves;
e. the amount of measurements is reduced, i.e. the number of measured radio access technologies (RAT) and the number of measured values per RAT are reduced with respect to normal idle mode;
f. the amount of reported values for each measurement reporting is reduced with respect to normal idle mode.

Please note that in the above, "frequency" denotes to the frequency of occurrence in time (e.g. the periodicity) of e.g. the mobile terminal 105 carrying out a measurement instead of a radio frequency used by e.g. the mobile terminal 105 for carrying out a measurement.

In 704, the adapted parameters are obtained by the mobile terminal 105. This may be achieved in different ways:
a. They are signaled to the mobile terminal 105 by the network side, e.g. a base station 103, e.g. via dedicated RRC (radio resource control) signaling. For this, the Measurement Information Elements defined in the 3GPP standard as part of the RRC Information Elements may for example be used wherein the adapted parameters for the idle mode procedures are included.
b. They are pre-defined in the mobile terminal 105.
c. The mobile terminal obtains the unadapted parameters from the network side (i.e. the parameters used for normal idle mode), e.g. a base station 103, and adapts them to the adapted parameters itself according to a pre-defined adaption method, e.g. based on adaption parameters (e.g. scaling factors or extension factors).

The low mobility state for the mobile terminal 105, i.e. whether the mobile terminal 105 is in a mobility class of terminals with low mobility, or, in other words, that the mobile terminal 105 is a low mobility device, may for example be declared in the following ways:
a. The mobile terminal 105 can be declared as a static or low mobility mobile terminal via a (trusted) third party. This property of the mobile terminal 105 is for example stored in a memory of a component of the network side of the communication system 100 (e.g. of an HLR). For example, a vending machine operator can inform the communication network (i.e. the network side of the communication system 100) about the low mobility property and about the presence of the new device (the mobile terminal 105) at a given location.

b. The mobile terminal 105 may request to be declared to be a low mobility device. For this, the mobile terminal 105 for example transmits a message to the communication network, (e.g. the base station 103), e.g. during network attachment. Included in the request message may be a reason for the request (e.g. specification that the mobile terminal 105 is currently not moving) or a device type (e.g. "vending machine").

c. The low mobility state may be declared automatically. For example, in case the mobile terminal 105 is staying in the same radio cell 104 for a given time duration, the communication network automatically declares the mobile terminal 105 to be a low mobility mobile terminal 105. The mobile terminal 105 may for example send a trigger signal to the communication network when it starts to move again. This trigger signal makes the communication network (e.g. the base station 103) to switch from low mobility state to normal state with respect to the mobile terminal 105, e.g. expects measurements or location area information as it does from non-low mobility mobile terminals. Using such a trigger signal can be used to avoid unavailability in case the mobile terminal is suddenly starting to move quickly.

d. A change of the category (i.e. the class) of the mobile terminal 105 may also occur automatically. For example, when the mobile terminal 105 is installed into a car, it is classified as low mobility device while the car is parked and the class is changed such that it is no longer classified as low mobility device (but e.g. as normal mobility device) when the car moves. The trigger for such a change could be the car's engine, i.e. while the engine is turned off, the UE is classified as low mobility device and when the engine runs, the UE is using normal idle mode.

Embodiments allow reducing the activities in idle mode of a mobile terminal 105 with low mobility. Thus, the power consumption of the mobile terminal 105 may be reduced and the radio resources of the air interface (between the mobile terminal 105 and the respective base station 103) needed for e.g. periodic location update and measurement reporting are less occupied. Also less computational resources of the mobile terminal 105 are needed to perform the idle mode measurements and signaling. Further, the resources of the communication network needed to process the received data from the mobile terminal 105 in idle mode are reduced.

In the following, embodiments are described in greater detail. The embodiments are described with reference to the communication system 100 described with reference to FIG. 1 which is in the following, as an example, assumed to be an LTE-Advanced communication system based on OFDMA/TDMA in downlink, SC-FDMA/TDMA in uplink, and to operate in FDD mode.

In the embodiment described in the following, there is a semi-static activation of "low mobility idle mode".

It is assumed in this example that the mobile terminal 105 is mounted in a vending machine. It is used to transmit alert messages to the operator of the vending machine in case one or more products get out of stock. This action is triggered by the vending machine. Further, the mobile terminal 105 is used sporadically by the vending machine operator to ask for the stock level.

The mobile terminal 105 is pre-configured to use always low mobility idle mode instead of the normal idle mode. Further it is enabled to receive a low mobility idle mode configuration message and to use the parameters included in the low mobility idle mode configuration message.

In this embodiment, the core network 102 includes an HLR in which the mobile terminal is marked as low mobility device in the corresponding subscriber data.

An MME 109 is enabled to receive a low mobility idle mode activation message from the HLR.

The base station (eNodeB) 103 operating the radio cell 104 in which the mobile terminal 105 is located is configured to receive a low mobility idle mode configuration message from the MME 109, to choose a useful set of (adapted) parameters (to be used in low mobility state) for the mobile terminal 105 and to transmit a low mobility idle mode activation message with adaptation parameters (e.g. extension factors) to the mobile terminal 105 for allowing the mobile terminal to determine the selected parameters, for example from the parameters used in normal mobility mode. Alternatively, the base station 103 may transmit the selected (adapted) parameters itself to the mobile terminal 105.

The message flow according to this embodiment is illustrated in FIG. 8.

FIG. 8 shows a message flow diagram 800.

The flow takes place between a mobile terminal 801 corresponding to the mobile terminal 105, an eNodeB 802 corresponding to a base station 103, an MME 803 corresponding to the MME 109 and the HLR 804 as mentioned above.

In 805, the mobile terminal 801 is switched on the first time. It searches for a suitable radio cell 104 and attaches to the communication network by transmission of an IMSI (International Mobile Subscriber Identity) attach message 806 in 807.

In 808, the HLR 804 receives the attach message 806, reads the mark "low mobility device" for the mobile terminal 801 from its storage and decides that the low mobility idle mode (LMIM) should be activated for the mobile terminal 801. To activate the low mobility idle mode, the HLR 804 transmits a low mobility idle mode activation message 809 to the MME 803 in 810.

In 811, the MME 803 reads the low mobility idle mode activation message 809 and enables the low mobility idle mode for the mobile terminal 801. This means that for example, the procedure for removing the context of mobile terminal 801 in case no periodic tracking area update is received from the mobile terminal 801 that is used in normal idle mode is no longer used after having entered low mobility idle mode. The MME 803 adds the low mobility idle mode to the context for the mobile terminal 801 and forwards, in 812, the low mobility idle mode activation message 809 to the eNodeB 802.

In 813, the eNodeB 802 reads the low mobility idle mode activation message 809 and enables the low mobility idle mode for the mobile terminal 801. The eNodeB 802 chooses a useful set of adapted parameters or adaptation parameters for the mobile terminal 801. The adapted parameters or adaptation parameters are for example selected depending on the number of mobile terminals 105 that are currently camping on this cell 104, i.e. that are currently located (and registered) in the radio cell 104. For example, the more mobile terminals 105, the larger an extension factor $F_E$ (described below) is set. The extension factor may also be a semi static value.

In this example, it is assumed that the number of mobile terminals camping in the radio cell 104 is larger than 100 and the extension factor is set (as adaptation parameter) individually for each parameter that is to be adapted for low mobility idle mode as shown in table 1.

TABLE 1 parameters for the low mobility idle mode

| Symbol | Value | Meaning |
| --- | --- | --- |
| $F_{E,SI}$ | 20 | Extension factor for monitoring the system information |
| $F_{E,PCH}$ | 5 | Extension factor for monitoring the paging channel |
| $F_{E,reselection}$ | Infinite | Extension factor for measurements for cell reselection |

In 814, the eNodeB 802 transmits the low mobility idle mode activation message 809 to the mobile terminal 801 wherein the eNodeB 802 has included the adaptation parameters (extension factors in this example) shown in table 1.

In 815, the mobile terminal 801 reads the low mobility idle mode activation message 809 and the system information for the idle mode parameters. It calculates the adapted parameters for low mobility idle mode by multiplying the corresponding parameters for the normal idle mode by the respective extension factor contained in the received message. Then it enters the low mobility idle mode (LMIM).

For example the period for performing measurements for cell reselection $T_{reselection}$ may be calculated as follows: $T_{reselection,low\ mobility} = T_{reselection} * F_{E,reselection} = $ "Infinite". This means, that no cell reselection measurements are performed by the mobile terminal 801. This may for example be useful for machines that are not be moved during operation. Nevertheless, the mobile terminal 801 could be forced to search for a new radio cell 104 e.g. by switching off the mobile terminal 801 and switching the mobile terminal 801 on again. This will for example be typically done implicitly in case the machine is moved to a new location. In this case the power supply of the machine is typically unplugged and the mobile terminal 801 is switched on at the new location (and restart the flow with 805).

Similar calculations are for example performed for the period of monitoring the system information and for the period of monitoring the paging channel.

In this example, at a later point in time, the eNodeB 802 decides to change the parameters used for the low mobility idle mode by the mobile terminal 801 (e.g. due to changed number of camping UEs in this cell). Accordingly, the eNodeB 802 transmits a low mobility idle mode configuration message 816 to the mobile terminal 801 in 817. The same parameters as in the low mobility idle mode activation message 809 transmitted in 814 are included but with new values as decided by the eNodeB 802. The low mobility idle mode configuration message 816 is sent as part of the system information and is received by all mobile terminals 105 that are currently using low mobility idle mode and that are camping on the respective radio cell 104. It is thus easily possible to re-configure all low mobility devices within a radio cell 104 by transmission of only one low mobility idle mode configuration message.

In 818, the mobile terminal 801 re-determines the parameters to be used in low mobility idle mode based on the adaptation parameters (extension factors in this example) included in the second low mobility idle mode configuration message 816.

The embodiment described above with reference to FIG. 8 is for example applicable in case that the mobile terminal 105 will not or will very unlikely change its low mobility behavior. In this embodiment, low mobility idle mode is especially applicable for all enabled mobile terminals attached to the network. Low mobility idle mode can be enabled with very low amount of signaling and after initial configuration there's is no need for further signaling except if the configuration (i.e. the parameters to be used in low mobility idle mode) should be changed.

In the following embodiment, there is a dynamic activation and deactivation of the low mobility idle mode.

In the following example, it is assumed that the mobile terminal 105 is mounted in a rental car. In case that the car is parked, the mobile terminal 105 is used for transmission of alarm messages in case someone broke into the car. In case the car is driven, it is used for tracking the position of the car periodically. Additionally, it is assumed that for both cases the mobile terminal 105 is used sporadically by a rental car service centre to get information from the car, e.g. the current position of the car or data of the car's engine (oil level, next service date, etc.).

In this example, the mobile terminal 105 is configured to detect its current mobility behavior based on different triggers (e.g. the change of received signal strength from the serving base station 103, i.e. of the base station 103 operating the radio cell 104 in which the mobile terminal 105 is registered or the mobile terminal 105 entering or leaving a radio cell 104).

The mobile terminal 105 is further configured to request the usage of the low mobility idle mode or the normal mobility idle mode and to use different configurations for idle mode behavior based on its current mobility state.

The MME 109 is configured to receive a low mobility idle mode request and a normal mobility idle mode request from the mobile terminal 105 (which is forwarded by the base station 103), to use different configurations for idle mode behavior based on the indicated mobility state, e.g. to use appropriate timer values and to transmit a low mobility idle mode accept or a normal mobility idle mode confirm to the base station 103.

The base station 103 is preconfigured with parameters used for low mobility idle mode. Further, it is configured to receive a low mobility idle mode accept and a normal mobility idle mode confirm from the MME 109, to use different configurations for idle mode behavior based on the indicated mobility state, e.g. to use appropriate timer values, and to transmit a low mobility idle mode accept or a normal mobility idle mode confirm to the base station 103.

The message flow according to this embodiment is illustrated in FIG. 9.

FIG. 9 shows a message flow diagram 900.

The flow shown in FIG. 9 takes place between a mobile terminal 901 corresponding to the mobile terminal 105, an eNodeB 902 corresponding to the base station 103, and an MME 903 corresponding to the MME 109 as mentioned above.

It is assumed that in 904, the mobile terminal (UE) 901 is acting in normal mode (i.e. is not set to use low mobility idle mode when in idle mode but uses normal idle mode when idle) and has an ongoing connection while the car is moving. The mobile terminal 901 reports periodically its position to the rental car service centre.

In 905, state detection occurs. It is assumed that the car stops at the final parking position. The driver leaves and locks the car and the position reporting by the mobile terminal 901 stops. Then the mobile terminal 901 enters normal idle mode and starts all relevant procedures as defined for the "camped normally state" according to the 3GPP standard. Additionally the mobile terminal 901 starts a timer after it enters the normal idle mode and starts to monitor changes of the received signal strength from the serving base station 902. This is done to detect whether the mobile terminal 901 is moving or not. Once the timer reaches a certain value T without significant changes of the received signal strength, the mobile terminal 105 determines that the condition for the low mobility state are met, i.e. for the usage of low mobility idle mode when being in idle mode. In this context, no significant changes mean that the received signal strength is between an upper and a lower (e.g. pre-defined) threshold, e.g. not exceeding +2 dB and −2 dB related to the received signal strength measured when the timer starts.

In 906, the mobile terminal 901 requests to enter low mobility idle mode by transmission of a low mobility idle mode request message 907 towards the MME 903 (via the base station 902 which forwards the low mobility idle mode request message 907).

In 908, the MME 903 adds the low mobility idle mode to the context for the mobile terminal 901 and starts using the adapted parameters (i.e. parameters adapted with respect to normal idle mode) that are predefined for the low mobility idle mode. For example, the method for removing the context of the mobile terminal 901 in case no periodic tracking area update is received that is used in normal idle mode is no longer used in low mobility idle mode. In one embodiment, periodic tracking area updates are not transmitted by the mobile terminal 901 when it is in low mobility idle mode and accordingly, periodic tracking area updates are not expected by the MME 903 from a mobile terminal 901 that is in low mobility idle mode.

Optionally, the MME 903 may decide to reject the request. In this case the UE context and the behavior of the MME 903 are not changed. Please note that the message flow shown illustrates the case that the MME 903 accepts the request.

In 909, the MME 903 transmits a low mobility idle mode accept message 910 to the eNodeB 902.

In case the MME 903 decides to not to accept the request in 908, it transmits a low mobility idle mode reject message towards the eNodeB 902.

In 911, the eNodeB uses the low mobility idle mode related configuration for the mobile terminal 901 upon reception of the low mobility idle mode accept message 910. For example, the eNodeB 902 reduces the number of paging occasions for the mobile terminal 901, e.g. by the factor $F_E=10$ (with respect to the number of paging occasion configured for the normal idle mode of the mobile terminal 901). The extension factor $F_E$ and the new position of the paging occasions are in this example predefined in the eNodeB 902. In 912, the eNodeB 902 forwards the low mobility idle mode accept message 910 to the mobile terminal 901. The base station 902 may in one embodiment include adaptation parameters (e.g. an extension factor) into the low mobility idle mode accept message 910 before forwarding it to the mobile terminal 901.

In case the eNodeB 902 receives a low mobility idle mode reject message from the MME 903, it forwards the low mobility idle mode reject message to the mobile terminal 901 and does not change its behavior towards the mobile terminal 901 with respect to idle mode.

In 913, the UE starts to act in low mobility idle mode upon reception of the low mobility idle mode accept message 910. This means it starts using the parameters which are dedicated for the low mobility idle mode when in idle mode. In this example, for this, the mobile terminal 901 reads the broadcast parameters from the system information which are intended for the normal idle mode and it modifies the parameters according to one or more adaptation parameters, e.g. one or more extension factors. For example, the paging channel is monitored less often wherein the extension factor $F_E$ and the new paging occasion positions are predefined and are the same as used by the eNodeB 902. The periodicity for monitoring the system information and for performing measurements for cell reselection are for example also reduced by the factor $F_E$.

In case that the mobile terminal 901 receives a low mobility idle mode reject message, the mobile terminal 901 keeps on acting according to normal idle mode. It may or may not send another low mobility idle mode request message towards the MME 903 at a later point in time.

It is assumed that in 914 the mobile terminal 901 detects that the condition for the low mobility state are no longer fulfilled. Several events may lead to this detection. For example, the mobile terminal 901 detects significant changes at the received signal strength of the serving cell, e.g. the signal strength level decreases about more than 5 dB. In this case, the mobile terminal 901 sends a normal mobility idle mode request message to the eNodeB 902.

the mobile terminal 901 has to enter the connected mode, e.g. because it receives a corresponding message on the paging channel or because it detects that someone broke into the car and therefore it wants to inform the police or the rental car service centre. In this case a normal connection setup is performed and the eNodeB 902 and MME 903 implicitly releases the low mobility idle mode for the mobile terminal 901 based on the received messages for the connection setup.

In this example, it is assumed that the mobile terminal 901 transmits a normal mobility idle mode (NMIM) request message 915 to the MME 903 (via the base station 902) in 916.

In 917, the MME 903 receives the normal mobility idle mode request message 915, removes the low mobility idle mode from the context for the mobile terminal 901 and uses the parameters that are predefined for the normal mobility idle mode for the mobile terminal 901.

In 918, the MME 903 transmits a normal mobility idle mode confirm message 919 to the eNodeB 902.

In 920, the eNodeB uses the normal mobility configuration for the mobile terminal 901 and forwards the normal mobility idle mode confirm message 919 to the mobile terminal 901 in 921.

In 922, the mobile terminal 901 enters normal mobility idle mode, i.e. normal idle mode. It behaves as originally defined for the idle mode. In parallel it tries to detect the low mobility idle mode in 905 and performs the corresponding steps following 905 if low mobility state is detected.

The embodiment described above with reference to FIG. 9 is applicable in case that the scenario and therefore the mobility behavior of the mobile terminal 901 may change from time to time. Low mobility idle mode is beneficially applicable for all mobile terminals 105 attached to the network for which it is enabled.

In one embodiment, a mobile terminal may have a low mobility idle mode in which it transmits no location update information at all.

For example, in one embodiment, a mobile terminal is provided including a transmitter configured to transmit data to a base station of a cellular mobile communication network; a receiver to receive data from the base station of a cellular mobile communication network and a controller configured to establish or release communication connections with the base station and configured to control the mobile terminal for data transmission from the mobile terminal to the base station and for data reception from the base station by the mobile terminal wherein the controller is further configured to control the mobile terminal such that the mobile terminal does not send any location area update information.

Such a configuration may for example be used for a mobile terminal that is pre-defined as low mobility device and permanently is in low mobility state such that it does not need to support normal idle mode. Illustratively, in one embodiment, a mobile terminal is provided that does not send any location area update information but being otherwise configured like a normal mobile terminal of a cellular mobile communication system and being configured to act as a terminal device of the cellular mobile communication system, e.g. like the mobile terminal 105. For example, the mobile terminal is configured such that it has an idle mode according to which it does not send any location area update information, in contrast to a normal idle mode used by normal (i.e. non-low mobility) mobile terminals.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile radio communication network device comprising:
   a receiver configured to receive control information from a mobile terminal wherein the receiver is configured to receive the control information in a first mode or in a second mode, wherein in the second mode, less of the control information is received in time from the mobile terminal than in the first mode,
   a controller configured to control the receiver to receive the control information in the first mode if the mobile terminal is associated with a first mobile terminal mobility class and to control the receiver to receive the control information in the second mode if the mobile terminal is associated with a second mobile terminal mobility class, wherein the second mobile terminal mobility class is a class of terminals with lower mobility than the first mobile terminal mobility class, and to select an extension factor, if the mobile terminal is associated with the second mobility class, based on a number of mobile terminals currently camped on a cell on which the mobile terminal is camped or a semi-static value; and
   a signaling circuit configured to signal the extension factor to the mobile terminal to adjust a frequency at which the control information is to be transmitted.

2. The mobile radio communication network device according to claim 1, wherein the control information comprises at least one of reception quality measurement information and location information.

3. The mobile radio communication network device according to claim 1, further comprising:
   a determining circuit configured to determine whether the mobile terminal is associated with the second mobile terminal mobility class.

4. The mobile radio communication network device according to claim 3,
   wherein the determining circuit is configured to determine whether the mobile terminal is associated with the second mobile terminal mobility class based on an indicator indicating whether the mobile terminal is associated with the second mobile terminal mobility class stored in the communication network.

5. The mobile radio communication network device according to claim 4, wherein the indicator is stored in a home location register of the communication network.

6. The mobile radio communication network device according to claim 3, wherein the receiver is further configured to receive a message specifying whether the mobile terminal is associated with the second mobile terminal mobility class stored in the communication network,
   wherein the determining circuit is configured to determine whether the mobile terminal is associated with the second mobile terminal mobility class based on the message.

7. The mobile radio communication network device according to claim 6, wherein the receiver is configured to receive the message from the mobile terminal.

8. The mobile radio communication network device according to claim 6, wherein the receiver is configured to receive the message from another mobile radio communication network device.

9. The mobile radio communication network device according to claim 3, wherein the determining circuit is configured to determine whether a mobility value associated with the mobile terminal is lower than a threshold mobility value wherein the mobility value specifies a movement speed of the mobile terminal and wherein the determining circuit is configured to determine the that mobile terminal is associated with the second mobile terminal mobility class if the mobility value is lower than the threshold mobility value.

10. The mobile radio communication network device according to claim 1,
    being configured to have no established communication connection to the mobile terminal in both the first mode and the second mode.

11. The mobile radio communication network device according to claim 1, being configured to have no established dedicated communication connection between the communication network device and the mobile terminal.

12. The mobile radio communication network device according to claim 1, wherein the receiver is configured to receive control information less frequently from the mobile terminal in the second mode than in the first mode.

13. The mobile radio communication network device according to claim 1, wherein the receiver is configured to receive control information with less detail from the mobile terminal in the second mode than in the first mode.

14. The mobile radio communication network device according to claim 1, wherein the receiver is configured to receive control information according to at least one first parameter in the first mode and to receive the control information according to at least one second parameter in the second mode, wherein the at least one second parameter is selected with respect to the at least one first parameter such that in the second mode, less of the control information is received in time from the mobile terminal than in the first mode.

15. A method for receiving control information, the method comprising:
    receiving control information from a mobile terminal using a receiver configured to receive the control information in a first mode or in a second mode, wherein in the second mode, less of the control information is received in time from the mobile terminal than in the first mode;
    controlling the receiver to receive the control information in the first mode if the mobile terminal is associated with a first mobile terminal mobility class;
    selecting an extension factor based on a number of mobile terminals currently camped on a cell on which the mobile terminal is camped or a semi-static value, the selecting of the extension factor associated with controlling the receiver to receive the control information in the second mode if the mobile terminal is associated with a second mobile terminal mobility class; and signaling the extension factor to the mobile terminal, the extension factor to be used by the mobile terminal to calculate frequency at which the control information is to be transmitted;

wherein the second mobile terminal mobility class is a class of terminals with lower mobility than the first mobile terminal mobility class.

16. A mobile terminal comprising:
a transmitter configured to transmit control information,
wherein the transmitter is configured to transmit the control information in a first mode or in a second mode, wherein in the second mode, less of the control information is transmitted in time than in the first mode;
a receiver configured to receive an extension factor from a base station; and
a controller configured to control the transmitter to transmit the control information in the first mode if the mobile terminal is associated with a first mobile terminal mobility class and to control the transmitter to transmit the information in the second mode if the mobile terminal is associated with a second mobile terminal mobility class, wherein the second mobile terminal mobility class is a class of terminals with lower mobility than the first mobile terminal mobility class, and to calculate a frequency at which the control information is to be transmitted in the second mode based on the received extension factor.

17. The mobile terminal according to claim 16, being a radio communication device of a cellular mobile communication network.

18. A method for transmitting control information comprising:
transmitting, by a mobile terminal, control information using a transmitter configured to transmit the control information in a first mode or in a second mode, wherein in the second mode, less of the control information is transmitted in time than in the first mode,
controlling the transmitter to transmit the control information in the first mode if the mobile terminal is associated with a first mobile terminal mobility class, and
calculating a frequency at which the control information is to be transmitted in the second mode based on applying an extension factor to a parameter associated with the transmission of the control information in the first mode,
controlling the transmitter to transmit the control information according to the calculated frequency in the second mode if the mobile terminal is associated with a second mobile terminal mobility class, wherein the second mobile terminal mobility class is a class of terminals with lower mobility than the first mobile terminal mobility class.

19. The mobile radio communication network device of claim 1, wherein the extension factor is to be used by the mobile terminal to calculate the frequency at which the control information is to be transmitted.

20. The mobile radio communication network device of claim 1, wherein the extension factor is to be used to adjust at least one of a frequency for monitoring system information by the mobile terminal, a frequency for monitoring a paging channel by the mobile terminal, or a frequency for performing measurements associated with cell reselection by the mobile terminal.

* * * * *